Patented Apr. 4, 1944

2,345,773

UNITED STATES PATENT OFFICE 2,345,773

PROCESS OF EXTRACTING LUPULIN

John Michael Schorr, New Orleans, La.

No Drawing. Application November 28, 1940,
Serial No. 367,571

3 Claims. (Cl. 99—50.5)

This invention relates to a process of extracting lupulin obtained from hops, and has for its object to provide a product in which the lupulin is held in a stable emulsion, which retains the volatilizable constituents of lupulin. Lupulin is a powder found in the little round glands which in turn are found upon the petals of the strobiles of the female hop vine. It is obtained by drying, heating and then sifting the hops.

The invention consists in emulsifying lupulin with a hot saccharogenous solution in a container capable of being entirely closed. At the boiling temperature the container is sealed, and then the sealed container is subjected to an agitation so as to thoroughly emulsify the lupulin and the saccharogenous solution, and bring about a dispersion of the lupulin in the mixture, until an optimum of an emulsion is obtained. During this agitation the emulsion cools as a result of which the volume is reduced within the sealed container, and a vacuum-like action results. The combined action of the vacuum and the agitation causes the separate lupulin globules to become worn down, and the essential oils are thereby liberated therefrom, but these are immediately dispersed in or become part of the sugar solution either by absorption or adsorption. This agitation is continued for several hours until the contents is relatively cool. If used in the brewing art, of beer or ale, the cooled condition is about the most desirable form in which it is to be added to the wort, or to the remaining portion of the brew. Also when desired to be used in the brewing art, wort is preferably added to the sugar solution contents of said container, and the emulsion is then one of lupulin principles, sugar solution and wort, and such enriched wort is then ready to be added, when cooled, to the remaining portion of the brew. A delicate hop aroma and flavor is then imparted to the entire brew, which is not generally obtained through other means.

The improved product, as an article of manufacture, has the indicia that the lupulin principle is entrained in the sugar solution, without vaporization of its volatiles, and is in the form of an emulsion of its essential oils with the sugar solution.

The invention will be more fully described hereinafter and finally pointed out in the claims.

In the preferred form of one embodiment of the invention, wort is used for the saccharogenous solution, and is strengthened further by the addition of a sufficient amount of dextrose, or other sugar, to increase the balling to approximately 25–40%. To this the hops, or the lupulin yellow powder thereof previously separated, are added. Instead of following these steps, one can add this lupulin or hops to the sugar solution, mix them, and then add wort. The more sugar present the more readily the dispersion occurs, although the viscosity of the solution must not be too thick or too thin. Aluminum barrels have been found quite satisfactory, although containers having inert material for their lining may be found better. The container is then filled almost entirely with this mixture of sugar and wort, or sugar solution alone, at boiling temperature, allowing just enough room to add the desired quantity of lupulin, which is then added. The container is tightly sealed as soon as the lupulin has been added, and then agitated by a suitable equipment, as a shaker, or rotator, so as to thoroughly mix the solution and aid the dispersion of the lupulin throughout the mixture. During this rolling action the contents of the container gradually cool, and a vacuum develops within the closed container. The combined action of the vacuum and the agitation of the contents causes the separate lupulin globules to wear down and the essential oils are thereby liberated from within the globules, and they enter into and are held within the relatively stable emulsion which has resulted from such agitation and vacuum action. This agitation is continued for several hours until the contents has been cooled sufficiently to entrain the essential oils, volatile and otherwise. The contents can then be added to the remaining portion of the brew in order to impart to it the delicate hop aroma and flavor to the entire brew. In addition to these characteristics of hops, hops have another function in the brewing art, namely, to precipitate protein. Hence, the rest of the brew referred to is treated with hops, by boiling the brew and hops, is the usual or normal procedure. Thereafter the wort is cooled following the regular procedure and the above improved emulsion is added at the cooler pan, in the starting tub, or at any subsequent and suitable step of the known normal process. The resulting beer possesses a finer and more delicate hop aroma due to the addition of the improved emulsion, since all of the desirable and essential constituents of the lupulin have been retained.

While its application to the brewing art has been described, the improved emulsion of a sugar solution and lupulin, with or without wort, can be marketed as an article of manufacture to be used as a seasoning for soup with salt. It is also applicable to other uses, as for medicinal purposes, either in a syrup or in tablets, or powder, in beverages other than beer.

Also, the method is applicable to other substances than wort or beer, since it has been found that in the making of ginger-ale, and also root beer, the various herbs used when boiled in a solution, result in a loss of their most valuable volatiles, whereas when emulsified as described with a hot sugar solution, in a closed vessel under seal, and agitated while being cooled, the valuable volatile constituents are retained and the resultant beverage considerably improved thereby.

It has been seen that the improved process and product overcomes one of the objections of the past, namely, that the valuable constituents of the hops have been lost. Essential oils of hops are not soluble in water, and thus in the past the boiling of such water with such essential oils, brought about the losses described. But by combining such essential oils with sugar solutions in emulsion form, the oils are retained as described. Furthermore, there are resinous substances in lupulin that are easily oxidized, and if lupulin is subjected to boiling temperatures in contact with the atmosphere, the resinous substances are oxidized to such extent that the flavor character in the resulting beer, when used in beer, is considerably altered. On the other hand, the lupulin added to a hot saccharogenous solution contained in a vessel entirely closed but not boiled therewith, and cooled under agitation, prevents the various flavor changes and the loss of the valuable constituents. Such an emulsion may be readily added to cooled wort, or an emulsion of another principle and a sugar solution may be added to other bases, and the flavor of the resulting beverages greatly enhanced.

The practice heretofore used was to add all of the hops to the boiling wort in the brew kettle, and thereby the tannic acid content helps to gain a precipitation of the undesirable proteins during the boiling process. When this is done much of the fine aromatic, subtle and more volatile characters of the hops are lost, due to the fact that the oils are volatilized and go off with the steam.

Attempts have been made to add the hops after the fermentation. This practice, known as dry hopping, frequently causes turbidities to develop, is difficult to control and is rather unsanitary. Another method used was to add a portion of the older hops during the first part of the boiling operation primarily to gain coagulation of the proteins. The other portions were added for the same purpose later in the boiling process, but that portion which is to be used for flavor and aromatic properties alone was added very close to the time the kettle is emptied, some brewers even placing their choicest quality hops in the hop jack or hop separator. In these known procedures much of the valuable constituents of the hops are allowed to go to waste. Again, some brewers realizing that very little tannic acid value is obtained from the hops added in the last portions just described, have used lupulin, the yellow powder adhering to the inner leaf surface of the female hop strobile. This lupulin is high in hop resin content and contains most of the volatile oils responsible for the ability of the hop to produce a fine aroma in beer. Lupulin is generally added to the body of boiling wort within the last few minutes of boiling or even after boiling has ceased, and during the time the kettle is being emptied. However as the wort is quite hot and the oils quite volatile, the more delicate flavors and substances were lost in the steam rising from the surface of the hot wort.

In contrast to this prior art, the present invention emulsifies the principle and the saturated sugar solution in a closed container to prevent dissipation of the volatiles and to assure their entrainment. Consequent agitating and cooling operations, without separation of the volatiles, insures the retention of the same. The emulsion extract is used in the manufacture of beer, or as stated, in the manufacture of medicines, or in extracts for other products, as root beer and the like. Of course, in each case, the emulsion after it has been cooled in the sealed container is removed therefrom if desired, that is, it is again exposed to the atmosphere, when it is being used. While in the sealed chamber the atmosphere was excluded.

I have described a method and an improved product, but I do not desire to be limited except by the prior art, since variations may be had, within the scope of the appended claims.

I claim as new:

1. The method of extracting taste and flavor principles from essential oil containing substances, which consists in emulsifying said principles with a boiling hot concentrated sugar solution, in a closed container, agitating the same, and cooling the same under the formation of a vacuum while agitating the same all under the exclusion of the atmosphere and liberating during said agitation under vacuum, the essential oils from within the globules of said substance, for entraining the taste and smelling principles of the substances without volatilization of said smell-producing principles and without oxidizing the taste-producing principles.

2. The method of extracting flavor substances from lupulin, which consists in emulsifying lupulin with a highly concentrated boiling hot solution of sugar in a closed container under exclusion of the atmosphere, and agitating the same, and then allowing the entire emulsion to cool under exclusion of the atmosphere and during this agitation producing a vacuum in the container, continuing such agitation under the action of the vacuum, and thereby liberating the essential oils from within the globules of said lupulin, and entraining and dispensing them in said sugar solution without volatilization of said smell-producing principles and without oxidizing the taste-producing principles.

3. The method of extracting taste and flavor principles from lupulin containing essential oils, which consists in agitating lupulin with essential oils therein with a sugar solution at boiling temperature in a closed container filled therewith for emulsifying lupulin with the sugar solution, and then agitating while cooling therein the emulsion thus formed under the formation of a vacuum and under exclusion of air, the combined action of agitation at boiling temperature and agitating under vacuum and cooling wearing down the essential oil containing globules of said lupulin to liberate the essential oils from within said globules in said sugar solution emulsification without volatilization of the smell-producing principles of said globules and without oxidizing the taste producing principles of the same.

J. M. SCHORR.